US010390608B2

(12) United States Patent
Scott et al.

(10) Patent No.: US 10,390,608 B2
(45) Date of Patent: Aug. 27, 2019

(54) SCISSOR TABLE WITH SAFETY SPACER AND TABLETOP LOCKING SYSTEM

(71) Applicant: Mity-Lite, Inc., Orem, UT (US)

(72) Inventors: Jonathan Scott, Spanish Fork, UT (US); Matthew Pectol, Provo, UT (US); Orrin Farnsworth, Santaquin, UT (US)

(73) Assignee: Mity-Lite, Inc., Orem, UT (US)

( * ) Notice: Subject to any disclaimer, the term of this patent is extended or adjusted under 35 U.S.C. 154(b) by 0 days.

(21) Appl. No.: 15/719,996

(22) Filed: Sep. 29, 2017

(65) Prior Publication Data

US 2019/0098992 A1    Apr. 4, 2019

(51) Int. Cl.
| | |
|---|---|
| A47B 3/08 | (2006.01) |
| F16M 11/38 | (2006.01) |
| A47B 13/08 | (2006.01) |
| A47B 3/091 | (2006.01) |

(52) U.S. Cl.
CPC .............. *A47B 3/08* (2013.01); *A47B 3/0918* (2013.01); *A47B 13/08* (2013.01); *F16M 11/38* (2013.01)

(58) Field of Classification Search
CPC ... A47B 3/0803; A47B 3/0809; A47B 3/0815; A47B 3/0818; A47B 2003/0821; A47B 13/003; A47B 2013/006; Y10T 403/7075; Y10T 403/7077; Y10T 403/7079; Y10T 403/7039; Y10T 292/0879;
(Continued)

(56) References Cited

U.S. PATENT DOCUMENTS

| 498,413 A | * | 5/1893 | Tobey |
| 581,915 A | * | 4/1897 | Lord |
| 914,514 A | * | 3/1909 | Rogers |

(Continued)

FOREIGN PATENT DOCUMENTS

| CH | 569447 | * | 11/1975 |
| DE | 202015008965 | * | 4/2016 |

(Continued)

OTHER PUBLICATIONS

Forbes, "Eco Flex Tables," https://www.forbesindustries.com. As Accessed on this date: Aug. 8, 2017, pp. 96-102.
(Continued)

*Primary Examiner* — Janet M Wilkens
(74) *Attorney, Agent, or Firm* — Thorpe, North & Western, LLP

(57) ABSTRACT

A scissor-type banquet or event table comprises a tabletop removably coupled to and disposable upon a stand. The stand comprises a pair of leg frames pivotally coupled together at an intersection. The pair of leg frames comprise adjacent spars with each of the spars associated with a different one of the pair of leg frames. A safety spacer is disposed between the adjacent spars of the pair of leg frames and separates the adjacent spars. The safety spacer has a thickness so that the adjacent spars are spaced-apart by a gap greater than ¾" to resist pinching a user's fingers. In addition, the tabletop and the stand are coupled together with a snap-fit. The snap-fit comprises detents between the tabletop and the stand. Each detent is biased into a respective hole along an axis between the detent and the respective hole.

14 Claims, 11 Drawing Sheets

(58) Field of Classification Search
CPC . Y10T 292/0885; Y10T 292/14; E05C 19/04; E05B 15/006
USPC ............... 108/115, 168, 169, 172, 174, 124; 248/166, 170, 188.6, 150, 225.11, 223.41
See application file for complete search history.

(56) References Cited

U.S. PATENT DOCUMENTS

| | | | | |
|---|---|---|---|---|
| 1,233,389 | A * | 7/1917 | Mosher | 108/124 |
| 1,259,580 | A * | 3/1918 | Wurz | 108/115 |
| 1,448,171 | A * | 3/1923 | Waderlow | A47C 9/105 |
| | | | | 108/116 |
| D80,586 | S * | 2/1930 | Thomas | |
| 1,792,555 | A * | 2/1931 | Thum | A47B 3/02 |
| | | | | 108/174 |
| 1,818,629 | A * | 8/1931 | Knapp | A47B 3/0812 |
| | | | | 108/129 |
| 2,010,394 | A * | 8/1935 | Herman | A47B 13/003 |
| | | | | 217/69 |
| 2,044,588 | A | 6/1936 | Moore | |
| 2,079,639 | A * | 5/1937 | Swensson | A47B 5/04 |
| | | | | 108/124 |
| 2,869,950 | A * | 1/1959 | Boccone | A47B 13/021 |
| | | | | 108/90 |
| 3,525,492 | A * | 8/1970 | Kaufman | A47B 23/046 |
| | | | | 108/115 |
| 4,905,612 | A * | 3/1990 | Apissomian | A47B 3/12 |
| | | | | 108/157.15 |
| 5,428,866 | A * | 7/1995 | Aschow | B60B 33/0002 |
| | | | | 16/30 |
| 5,483,904 | A * | 1/1996 | Kelly | A47B 13/08 |
| | | | | 108/156 |
| 5,872,191 | A * | 2/1999 | Sanchika | C08G 65/329 |
| | | | | 525/403 |
| 6,318,276 | B1 | 11/2001 | Reinecke | |
| 8,584,602 | B2 | 11/2013 | Isgro | |
| 8,925,468 | B2 | 1/2015 | Polidoros | |
| 9,402,468 | B1 * | 8/2016 | Chen | A47B 3/002 |
| 9,433,282 | B2 * | 9/2016 | Steelman | F16B 12/44 |
| 2003/0177960 | A1 * | 9/2003 | Schenker | A47B 3/0803 |
| | | | | 108/115 |
| 2007/0175369 | A1 * | 8/2007 | Reiner | A47B 3/02 |
| | | | | 108/118 |
| 2009/0044733 | A1 * | 2/2009 | Yeh | A47B 3/0803 |
| | | | | 108/132 |
| 2010/0147200 | A1 * | 6/2010 | Polidoros | A47B 3/12 |
| | | | | 108/157.16 |

FOREIGN PATENT DOCUMENTS

FR 1340943 * 10/1963
FR 2700931 * 8/1994

OTHER PUBLICATIONS

Mogog."Clix Collection," https://www.mogogo-buffet.com/ As Accessed on this date: Aug. 8, 2017, 11 pgs.
Lions Wood, "Presto Table," http://www.lwbanquetfurniture.com/event-management-tables As Accessed on this date: Aug. 8, 2017.
His Global Alliance, "Cross Cube Setup," http://ihsglobalalliance.com/em/cross-cube As Accessed on this date: Aug. 8, 2017.

* cited by examiner

SCISSOR TABLE WITH SAFETY SPACER AND TABLETOP LOCKING SYSTEM

BACKGROUND

Field of the Invention

The present invention relates generally to banquet or event tables, and more particularly, to a scissor-type banquet or event table.

Related Art

Banquet or event tables provide flexible display and presentation surfaces and are often used to present food at banquets or events. Such tables can be portable and storable. Some banquet tables are characterized as scissor tables that utilize so-called scissor legs that can pivot between open and closed configurations. The scissor moniker can derive from a pair of leg structures pivoting with respect to one another, similar to the handles and blades of a pair of scissors. Unfortunately, in actuality, the leg structures pivot in close proximity, or even abutting or sliding proximity, in a scissor or pinching action that can be dangerous to a user's fingers when folding the leg structures together. In addition, securing a tabletop to the leg structure can be challenging. Positively locking the tabletop to the legs can be secure, but more difficult to assemble and disassemble for use and storage. Passively disposing the tabletop on the leg structure can result in tipping or displacement of the tabletop and its associated contents. Furthermore, such tables have legs that are often formed of thin or narrow rod and tube stock, which can be, or which can appear, less stable.

SUMMARY OF THE INVENTION

It has been recognized that it would be advantageous to develop a banquet or event table to address the issues and challenges present in the market, some of which are outlined above. In addition, it has been recognized that it would be advantageous to develop a banquet or event table with a safer leg structure or stand that resists pinching or a scissor effect when folding for storage. In addition, it has been recognized that it would be advantageous to develop a banquet or event table that safely secures the tabletop to the leg structure or stand, while allowing for efficiently removing the tabletop for storage. Furthermore, it has been recognized that it would be advantageous to develop a banquet or event table that has a stand or legs with a more robust structure or appearance.

The invention provides a scissor-type banquet or event table. The table comprises a tabletop removably coupled to and disposable upon a stand.

In one aspect, the stand comprises a pair of leg frames pivotally coupled together at an intersection between the pair of leg frames. The pair of leg frames comprise adjacent spars with each of the spars associated with a different one of the pair of leg frames. The adjacent spars are pivotally coupled together at the intersection. The leg frames pivot about a pivot axis perpendicular to the tabletop when disposed on the stand. The leg frames pivot between an open use configuration in which the pair of leg frames traverse one another substantially perpendicularly, and a closed storage configuration in which the pair of leg frames are adjacent one another. A safety spacer is disposed between the adjacent spars of the pair of leg frames and separates the adjacent spars. The safety spacer has a thickness so that the adjacent spars are spaced-apart by a gap greater than ¾" to resist pinching a user's fingers in a scissor effect between the adjacent spars as the leg frames pivot between the open use configuration and the closed storage configuration.

In another aspect, the tabletop and the stand are coupled together with a snap-fit. The snap-fit comprises detents between the tabletop and the stand. Each detent is biased into a respective hole along an axis between the detent and the respective hole. Each detent has a tapered head with a reduced diameter engageable with and bearable against a perimeter of the respective hole. A lesser applied force applied transverse to the axis maintains the tapered head in the respective hole, while a greater applied force applied transverse to the axis displaces the tapered head along the axis out of the respective hole.

In another aspect, the stand and the leg frames comprise upright legs. Each leg comprising a pair of facing, nested channels forming a continuous perimeter wall. The pair of channels comprises a primary channel receiving a nested secondary channel therein. Each channel comprises a bottom wall and a pair of side walls and an open top. The primary channel has grooves formed in the pair of side walls to receive the side walls of the secondary channel. The bottom wall of the secondary channel closes the open top of the primary channel.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 6 is a cross-sectional side view of the stand of the table of FIG. 1a, taken along line 6 of FIG. 1a;

FIG. 12 is a partial top perspective view of a leg of the stand of the table of FIG. 1a; and FIG. 13 is an exploded perspective view of the leg of the stand of the table of FIG. 1a.

Figure 1A:
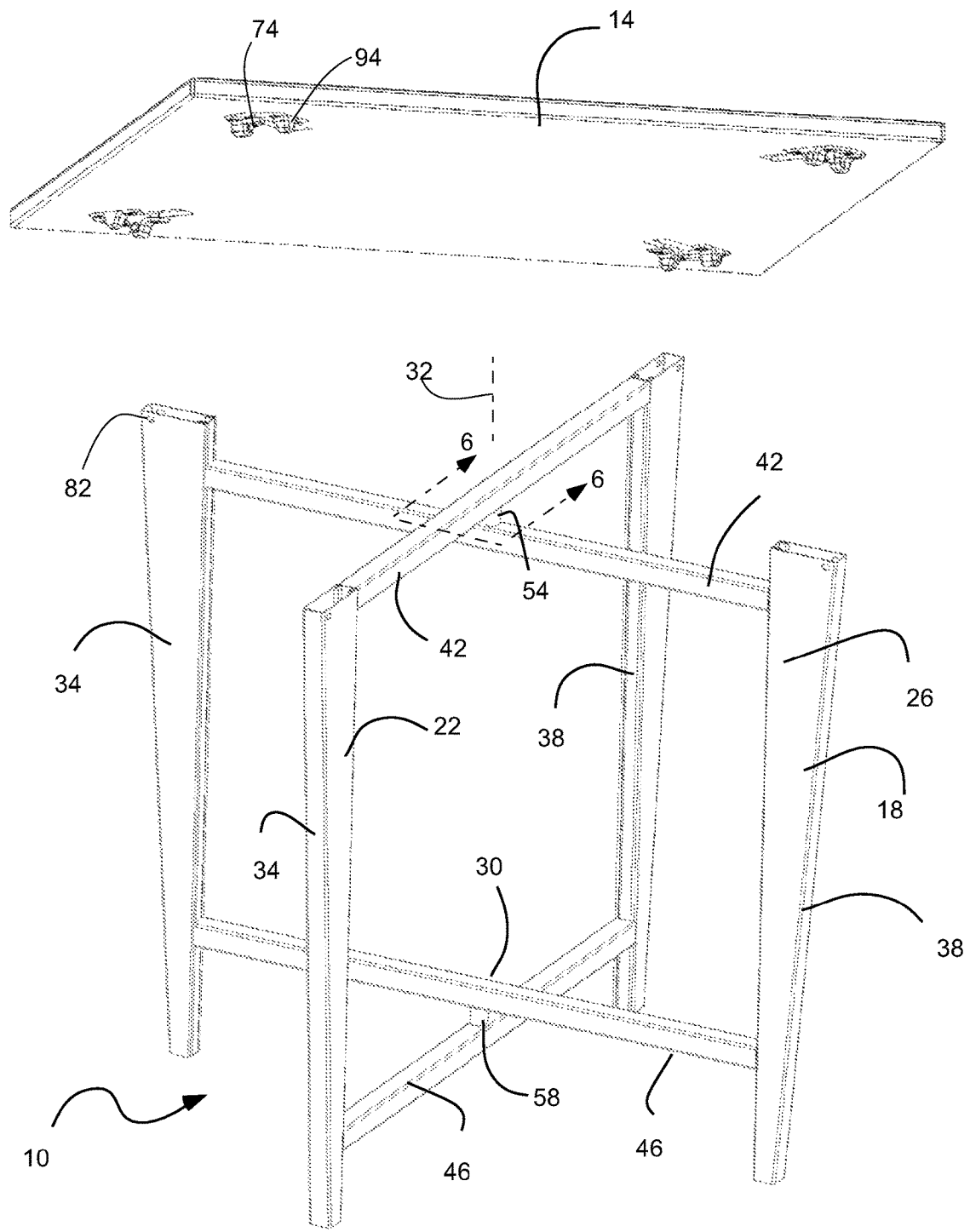
FIG. 1a is an exploded perspective view of a scissor-type banquet or event table in accordance with an embodiment of the present invention, shown with a tabletop removed from a stand, and shown with the stand, or leg frames thereof, in an open use configuration or orientation.
Figure 1B:
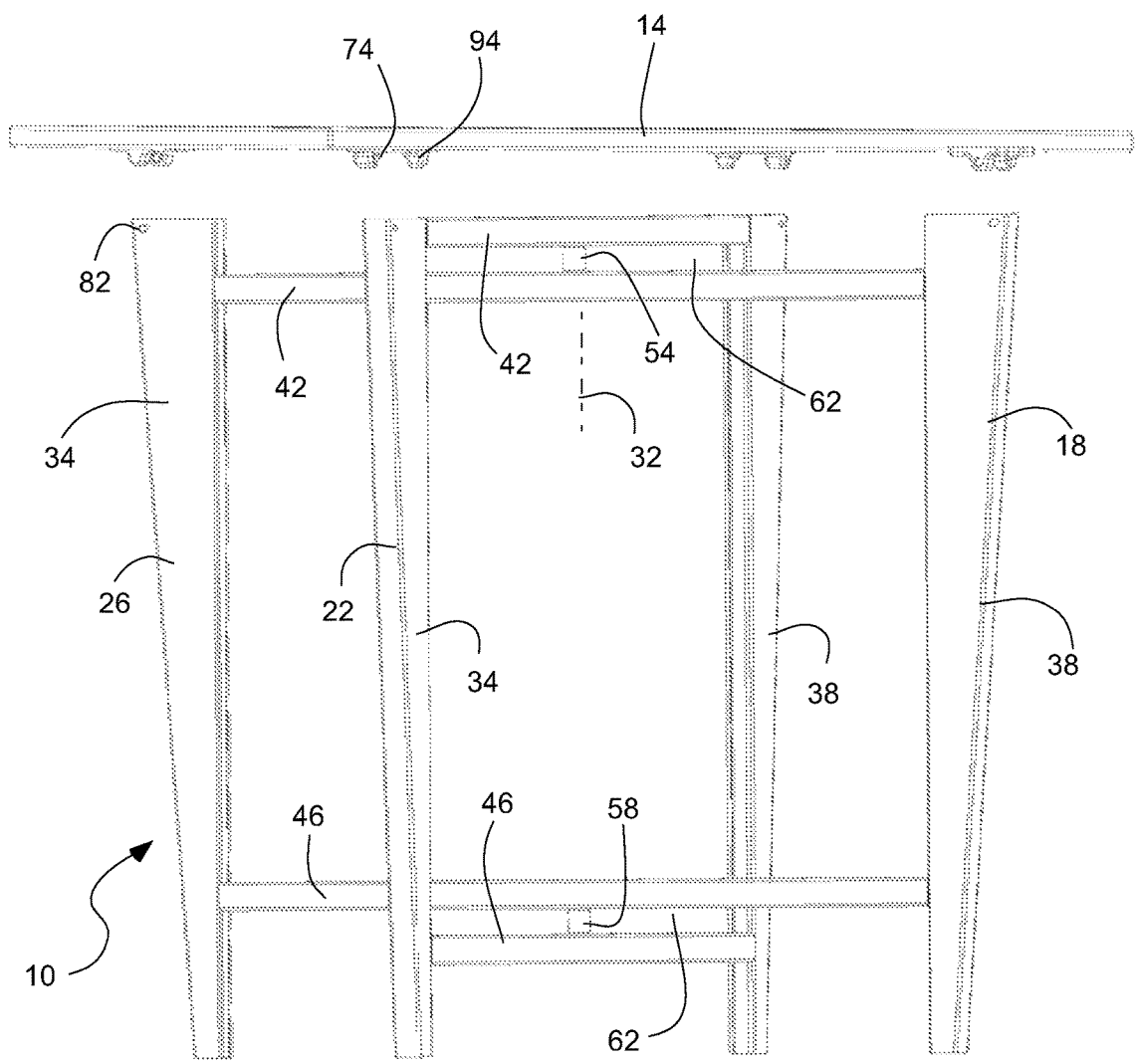
FIG. 1b is an exploded side view of the table of FIG. 1a, shown with the tabletop removed from the stand.
Figure 2:
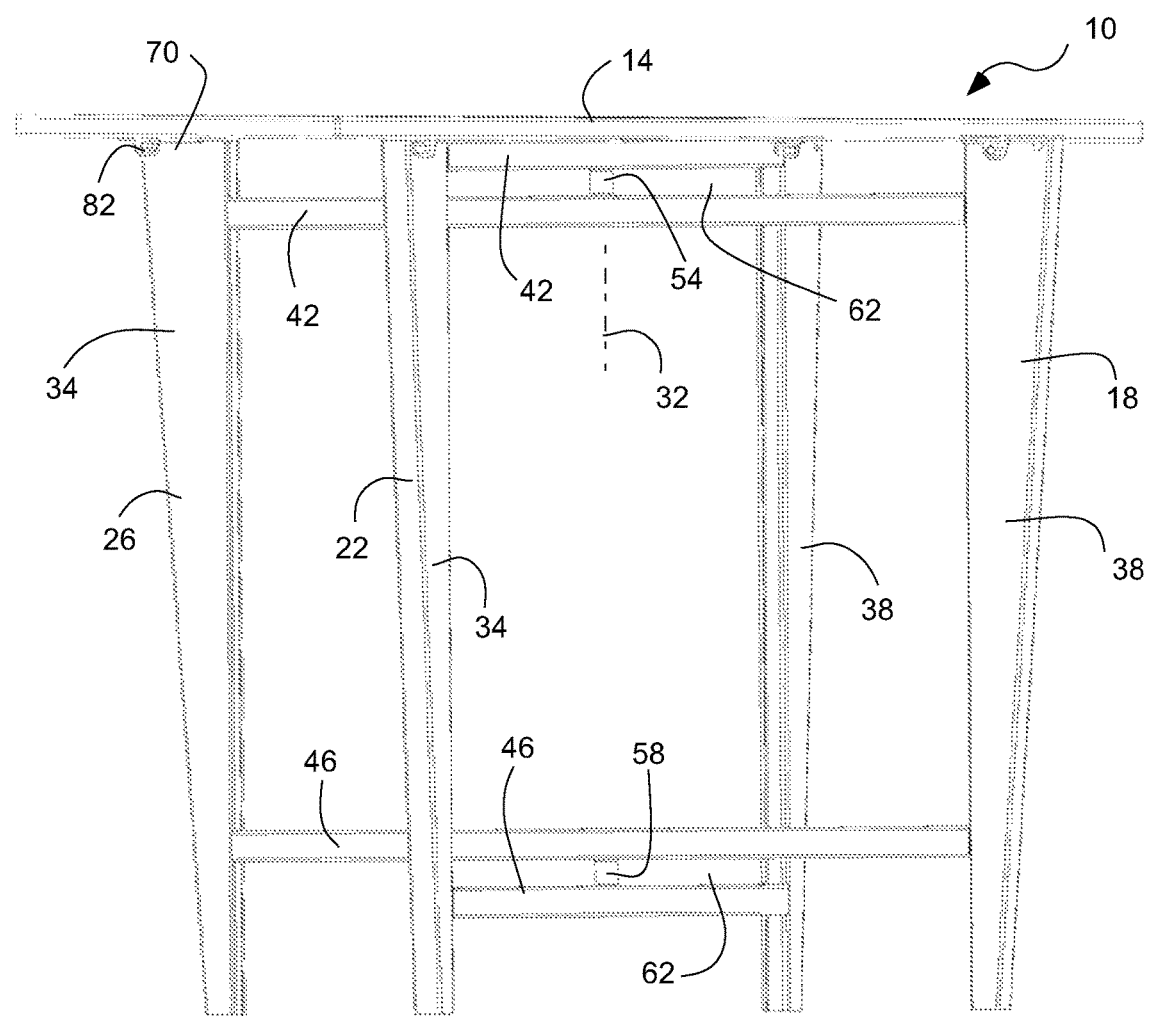
FIG. 2 is a side view of the table of FIG. 1a, shown with the tabletop disposed on the stand.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Before invention embodiments are disclosed and described, it is to be understood that no limitation to the particular structures, process steps, or materials disclosed herein is intended, but also includes equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term in the specification, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, the term "about" is used to provide flexibility to a numerical range endpoint by providing that a given value may be "a little above" or "a little below" the endpoint. It is understood that express support is intended for exact numerical values in this specification, even when the term "about" is used in connection therewith.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, sizes, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment. Furthermore, the described features, structures, or characteristics may be combined in any suitable manner in one or more embodiments. In this description, numerous specific details are provided, such as examples of layouts, distances, network examples, etc. One skilled in the relevant art will recognize, however, that many variations are possible without one or more of the specific details, or with other methods, components, layouts, measurements, etc. In other instances, well-known structures, materials, or operations are not shown or described in detail but are considered well within the scope of the disclosure.

Example Embodiments

An initial overview of technology embodiments is provided below and specific technology embodiments are then described in further detail. This initial summary is intended to aid readers in understanding the technology more quickly but is not intended to identify key or essential features of the technology nor is it intended to limit the scope of the claimed subject matter.

A table, such as a scissor-type banquet or event table, is provided. The table has a tabletop removably coupled to and disposed upon a stand. The stand can have a pair of intersecting and pivoting leg frames. The leg frames can be unfolded to an expanded, extended or transverse configuration with the tabletop secured thereon for use, and defining an open use configuration. The tabletop can be readily and efficiently secured to the stand without tools. In addition, the tabletop can be secured sufficient to resist the tabletop from coming off of the frame when a user leans on an edge or side thereof, or if the table is lifted by one or more users from the tabletop with the stand pendent therefrom, such as when positioning the table. The tabletop can be removed or disassembled from the stand, and the leg frames folded, defining a closed storage configuration. The tabletop can be readily and efficiently removed or disassembled from the stand without tools, and without damaging or otherwise altering the tabletop or the stand. Multiple tabletops can be stacked together for storage, while multiple associated stands can be folded and stacked together for storage.

In one aspect, the table can have a snap attachment between the tabletop and the stand, or the leg frames thereof, to readily and efficiently secure and remove the tabletop from the stand, without tools. The snap attachment can comprise detents that displace into and out of holes as the tabletop is disposed on and removed from the stand. The detents can be biased into the holes along an axis to maintain the tabletop secured to the stand. The detent can have a head with a tapered, conical, hemispherical, or otherwise reduced radius shape that bears against a perimeter of the hole. The biasing force or shape of the head or both can be capable of securing the tabletop to the stand such that a lesser applied force applied transverse to the axis maintains the tapered head in the respective hole, while a greater applied force applied transverse to the axis displaces the tapered head along the axis out of the respective hole. The lesser applied force can correspond to a force exerted by the user leaning on the edge or side thereof, or to one or more user's lifting the table from the tabletop with the stand pendent therefrom. The greater applied force can correspond to the user deliberately removing the tabletop from the stand, such as by lifting the tabletop while stepping on the stand.

In another aspect, the stand, or the leg frames thereof, can comprise spars or cross-members pivotally coupled together. The stand, or the leg frames thereof, can further comprise one or more safety spacers disposed between adjacent spars to separate the adjacent spars. The safety spacers can have a thickness so that the adjacent spars are spaced-apart sufficient to receive the user's finger(s) therein while resisting pinching or a scissor effect on the user's finger(s) between the adjacent spars as the leg frames pivot between the open use configuration and the closed storage configuration.

In another aspect, the stand, or the leg frames thereof, can comprise legs. The legs can be thicker or wider to provide a more robust structure or appearance. In addition, the legs can have a continuous perimeter, without exposed hollows, to resist collecting debris. In one aspect, the legs can be formed of sheet metal folded and joined to create the continuous perimeter. Each leg can comprise a pair of channels, with one channel nesting inside and closing another channel.

As illustrated in FIGS. 1a-13, a scissor-type banquet or event table, indicated generally at 10, in an example implementation in accordance with the invention is shown. The table 10 can be adapted for banquets or events. One or more tables can be arranged to present or display items or products, such as food. The table 10 can be collapsible disassembled for storage and expandable or assembled for use. When expanded or assembled, the table 10 can provide a horizontal presentation surface to receive items thereon. When collapsed or disassembled, the table 10 or components thereof can be condensed to a smaller volume or space for ease of handling and storage. The table 10 and components thereof can be durable and relatively light-weight to facilitate handling. Multiple similar or different tables, or combinations thereof, can be provided. Different tables can have different heights, different sizes of horizontal presentation surfaces, or different shapes of horizontal presentation surfaces, or combinations thereof, to present an aesthetically pleasing or enhanced functional presentation of the items. In addition, the different tables can have different styles, colors, materials, or combinations thereof to present a combination for enhanced aesthetics or functionality.

Figure 3:
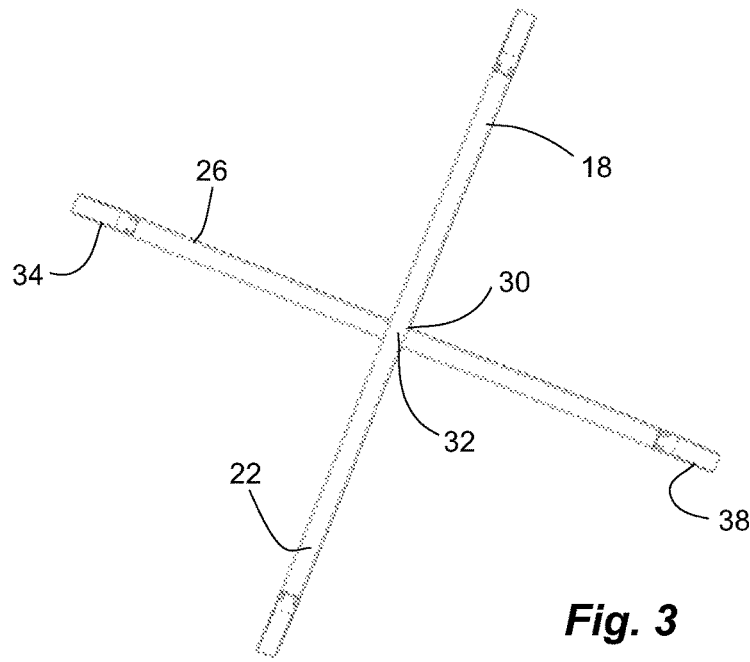
FIG. 3 is a top view of the stand of the table of FIG. 1a, shown without the tabletop removed for clarity, and shown with the stand, or the leg frames thereof, in the open use configuration.
Figure 4:
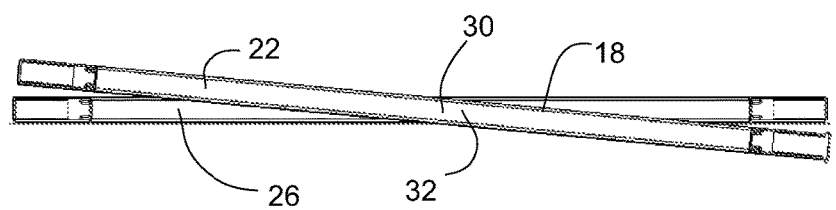
FIG. 4 is a top view of the stand of the table of FIG. 1a, shown with the tabletop removed for clarity, and shown with the stand, or the leg frames thereof, in a closed storage configuration.

The table 10 comprises a tabletop 14 removably coupled to and disposable upon a stand 18. The stand 18 is disposable on a support surface, such as the floor or the ground. The stand 18 extends from the support surface to the tabletop 14. The stand 18 can comprise a pair of leg frames 22 and 26. The leg frames 22 and 26 can be oriented upright and vertical. The leg frames 22 and 26 can intersect one another at an intersection 30 therebetween to form an x-shape when viewed from above, as seen in FIG. 3. The leg frames 22 and 26 are pivotally couple together at the intersection 30 therebetween. The leg frames 22 and 26 can pivot about a pivot axis 32 of an axle or hinge that is vertically oriented when the stand 18 is upright and that is perpendicular to the tabletop 14 when the tabletop is disposed on the stand.

In one aspect, each of the pair of leg frames 22 and 26 can comprise a pair of upright legs 34 and 38 disposed opposite one another on opposite sides of the respective leg frame. The legs 34 and 38 can be upright in that they can extend from the support surface to the tabletop 14. The legs can have any desired shape, such as straight, curved or arcuate, concave, etc. The upright legs 34 and 38 can be coupled together by one or more lateral spars, such as upper and lower spars 42 and 46. The one or more lateral spars 42 or 46 from different leg frames 22 and 26 can be disposed adjacent or proximate one another, and can be pivotally coupled together. For example, the upper spars 42 of the pair of leg frames 22 and 26 can be adjacent one another and pivotally coupled together, and the lower spars 46 of the pair of leg frames 22 and 26 can be adjacent one another and pivotally coupled together. The upper spars 42 can be disposed at or nearer an upper end of the stand 18 or the pair of leg frames 22 and 26 or the legs 34 and 38, while the lower spars 46 can be disposed at or nearer a lower end of the stand 18 or the pair of leg frames 22 and 26 or the legs 34 and 38. Thus, the upper spars 42 can be spaced apart from the lower spars 46. Each of the adjacent spars 42 or 46 can be associated with a different one of the pair of leg frames 22 and 26. Thus, one upper spar 42 can be associate with one leg frame 22, while the other upper spar 42 can be associated with the other leg frame 26. The legs 34 and 38, and the upper and lower spars 42 and 46, can be disposed in a substantially planer layer with a thickness much less than a height and a width of the respect leg frame 22 or 26. The leg frames 22 and 26 can be substantially similar, or substantially the same. The pair of leg frames 22 and 26 can comprise an inner leg frame 26 and an outer leg frame 22. The spars 42 and 46 of the outer leg frame 22 are located outside of the spars 42 and 46 of the inner leg frame 26. Thus, each leg frame can be assembled or manufactured separately, and then joined together by inserting the inner leg frame 26 between the spars of the outer leg frame 22.

The legs 34 and 38, and the spars 42 and 46, can be formed of metal such as tube stock or sheet stock, joined together, such as by welding. The legs 34 and 38 can be upright or substantially vertical, while the spars 42 and 46 can extend laterally or can be substantially horizontal. The spars 42 and 46 can be any shape, such as straight, curved or arcuate, etc. The adjacent spars 42 or 46 can be pivotally coupled together at the intersection 30, thus pivotally coupling the leg frames 22 and 26 together. The adjacent spars 42 or 46 can be pivotally coupled together by a fastener 50 (FIG. 6), defining an axle and the pivot axis 32, about which the adjacent spars pivot. The fastener 50, the axle and the pivot axis 32 can be vertically oriented when the stand 18 is upright, and can be oriented perpendicular to the tabletop 14. The leg frames 22 and 26 pivoting between an open use configuration (FIGS. 2 and 3) in which the pair of leg frames 22 and 26 traverse one another substantially perpendicularly, and a closed storage configuration (FIG. 4) in which the pair of leg frames 22 and 26, or the legs 34 and 38 thereof, are adjacent one another.

In one aspect, one or more safety spacers are disposed between the adjacent spars 42 or 46 of the pair of leg frames 22 and 26. An upper safety spacer 54 is disposed between the upper spars 42 of the pair of leg frames 22 and 26; and a lower safety spacer 58 is disposed between the lower spars 46 of the pair of leg frames 22 and 26. The safety spacers 54 and 58 separate the adjacent spars 42 or 46. The safety spacers 54 and 58 can have a thickness so that the adjacent spars 42 or 46 are spaced-apart by a gap 62. The gap 62 can be greater than ¾", in one aspect, greater than ⅞" in another aspect, greater than 1" in another aspect, and greater than 1⅛" in another aspect. Thus, safety spacers 54 and 58, and the gap 62 between the adjacent spars, resists pinching a user's finger(s) in a scissor effect between the adjacent spars as the leg frames 22 and 26 pivot between the open use configuration and the closed storage configuration. Both upper and lower safety spaces 54 and 58 can be used, forming the gap 62 between both the upper adjacent spars 42 and the lower adjacent spars 46, because the stand 18 can be rotated during assembly and disassembly, and the user's fingers can be in either gap during folding and unfolding. In one aspect, the safety spacer can be carried by one of the adjacent spars, and can abut to another of the adjacent spars. The upper safety spacer 54 can be carried by the upper spar 42 of the outer leg frame 22, and can abut to the upper spar 42 of the inner leg frame 26. The lower safety spacer 58 can be carried by the lower spar 46 of the inner leg frame 26, and can abut to the lower spar 46 of the outer leg frame 22. The safety spacers 54 and 58 can have a bore 66 (FIG. 6) therethrough and receiving the fastener 50 therethrough, and defining a bushing.

In addition, the tabletop 14 and the stand 18 can be removably coupled together with one or more snap-fits or releaseable snap-locks 70. In one aspect, the snap-fits 70 can be formed between the tabletop 14 and the leg frames 22 and 26, or the legs 34 thereof. In another aspect, the snap-fits 70 can comprise detents 74 (FIG. 9) extending between the tabletop 14 and the stand 16, or the leg frames 22 and 26 or the legs 34 thereof. The detents 74 can be biased, such as with a spring 78, into a respective hole 82 (FIG. 8) along an axis 86 (FIG. 9) between the detent 74 and the hole 82. In one aspect, the detents 74 can be carried by the tabletop 14, while the corresponding holes 82 can be formed in the legs 34, the leg frames 22 and 36, or the stand 18, as shown. The holes 82 can be elongated or can be slots oriented substantially parallel to the tabletop 14 to allow for manufacturing tolerances and facilitate engagement with the detent.

Each detent 74 can have a tapered head 90 with a reduced diameter engageable with and bearable against a perimeter of the respective hole 82. Thus, the head 90 with the reduced diameter is disposed in the hole 82 and bearable against the perimeter of the hole, as opposed to a shaft or shank of the detent. Thus, a lesser applied force applied transverse to the axis 86 maintains the tapered head 90 in the respective hole 82 (or is maintained in the hole by the spring 78 or biasing force), while a greater applied force applied transverse to the axis 86 displaces the tapered head 90 along the axis 86 out of the respective hole 82 (or displaces the detent 74 and compresses the spring 78). As described above, the lesser applied force can correspond to a force exerted by the user leaning on the edge or side thereof, or to one or more user's lifting the table from the tabletop with the stand pendent therefrom. The greater applied force can correspond to the user deliberately removing the tabletop from the stand, such as by lifting the tabletop while stepping on the stand. Thus, the snap-fits 70 and the detents 74 are designed to maintain the tabletop 14 on the stand 18 until deliberately removed therefrom.

In one aspect, the snap-fits 70 and the tabletop 14 can comprise locking brackets 94 coupled to an underside 98 of the tabletop. The locking brackets 94 can each receive a different portion of the stand 18, such as the tops of the legs 34. The locking brackets 94 can be disposed in a respective pocket 102 in the underside 98 of the tabletop 14. The pockets 102 can be shaped and sized to receive and align the locking brackets 94. Thus, the brackets 94 are appropriately and accurately spaced and oriented to receive the stand or legs thereof. In addition, the pockets 102 can be shaped and sized to receive the tops of the legs 34 of the leg frames of the stand. Each bracket 94 can have a slot 106 to receive a respective portion of the stand 18, such as the top of the leg 34. Each bracket 94 can have a detent 74 carried by the bracket on one side of the slot 106. As described above, the detent 74 can be biased, such as by spring 78, into the slot 106, and into the hole 82 in a side of the respective portion of the stand, such as the top of the leg 34.

In addition, each bracket 94 can have an angled side wall 110 on one side of the bracket 94 or the slot 106 opposite the detent 74. Thus, the detent 74 and the angled side wall 110 oppose one another across the slot 106. The angled side wall 110 can form an acute angle with respect to the tabletop 14, or the underside 98 thereof, to allow the tabletop 14 to pivot with respect to the portion or the leg 34 of the stand 18 when being removed or installed on the stand. Thus, as a user lifts one edge or end of the tabletop 14 to remove the tabletop 14 from the stand 18, that side of the tabletop 14, with the associated locking bracket 94, can separate from the leg 34 or the stand 18, while the opposite leg 34 can pivot in the slog 106 of the respective locking bracket 94. The angles side wall 110 allows the top of the leg 34 to pivot in the slot 106 while resisting damage to the leg 34 or the bracket 94 or both.

Figure 5:
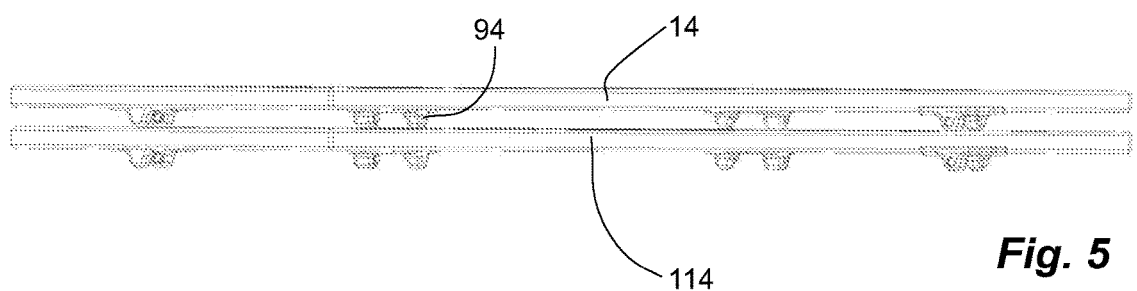
FIG. 5 is a side view of the tabletop of the table of FIG. 1a, shown with the stand removed for clarity, and shown with the tabletop in a storage configuration adjacent another tabletop.
Figure 6:
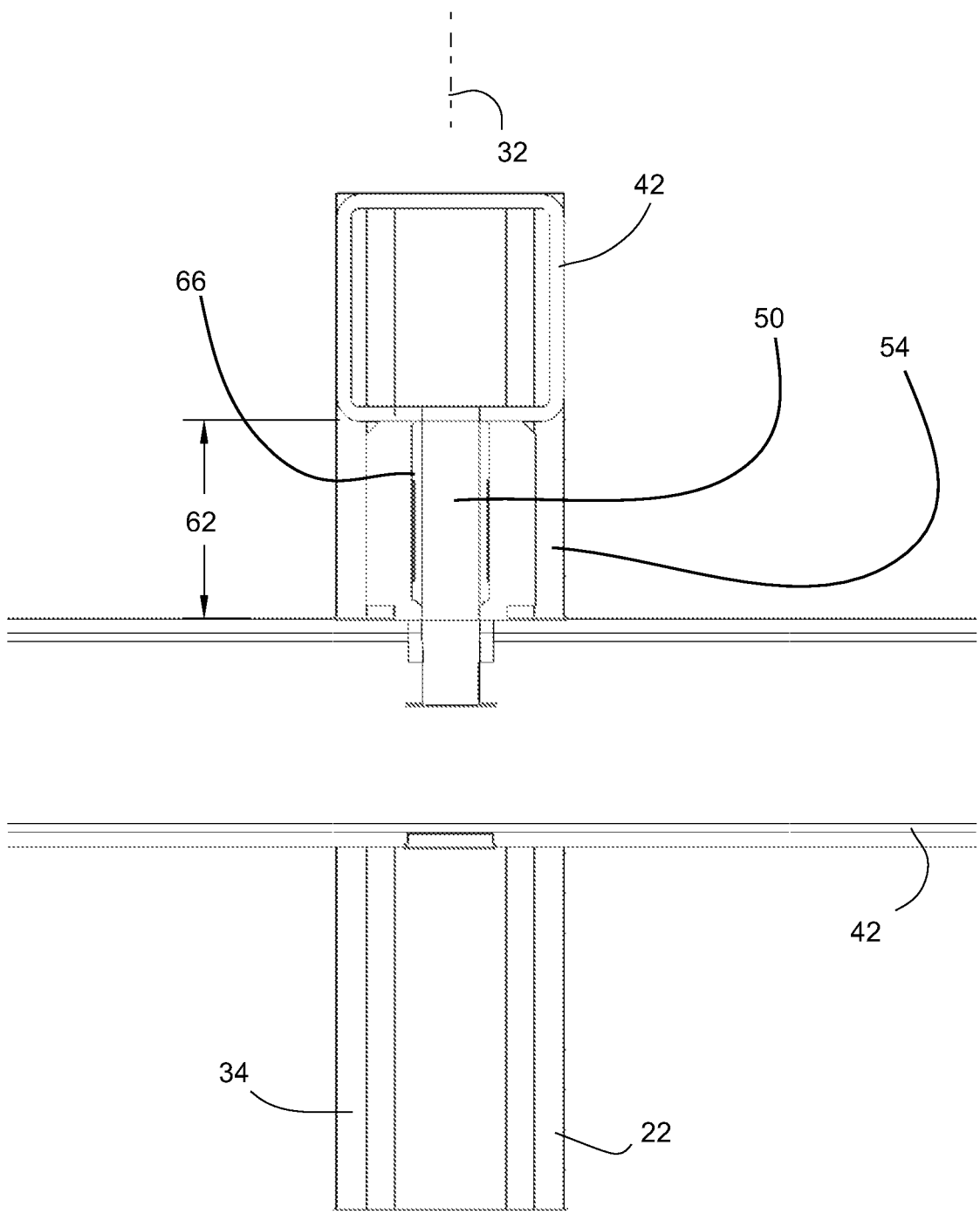
Figure 7:
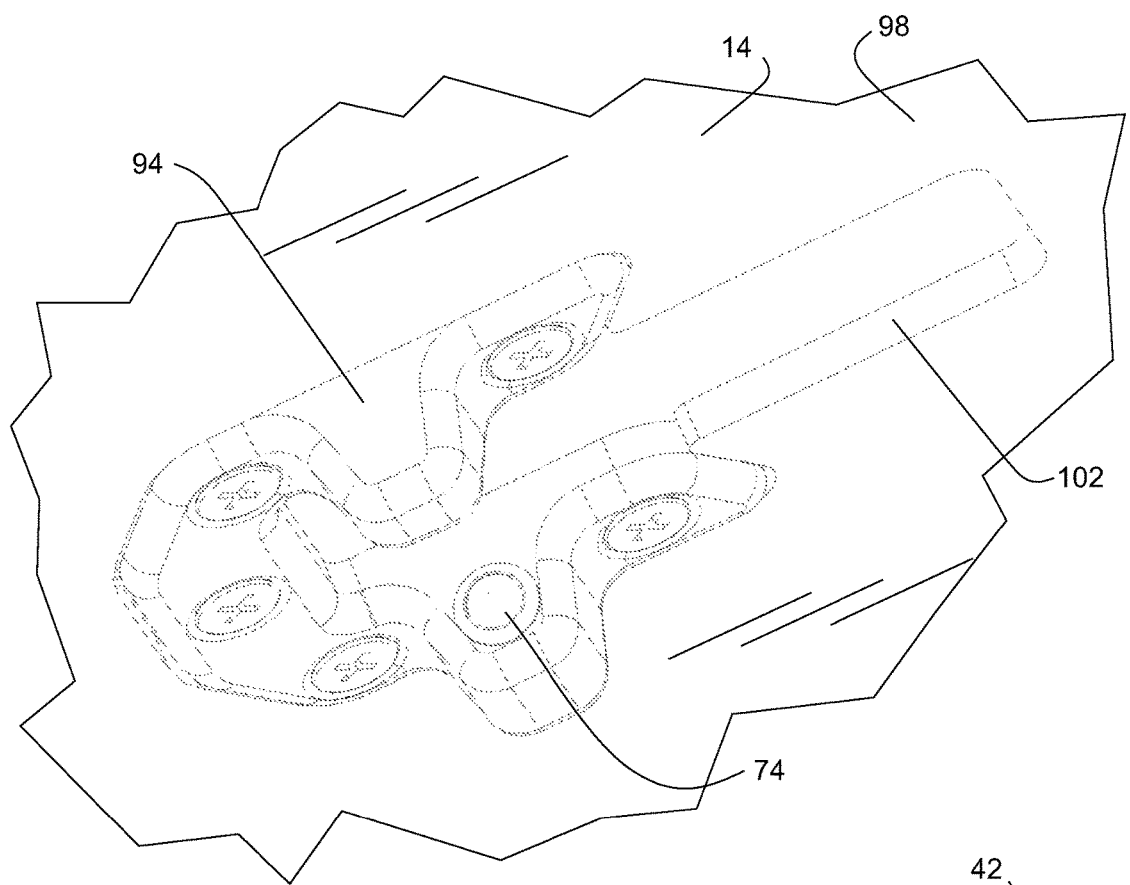
FIG. 7 is a partial bottom view of the tabletop of the table of FIG. 1a, showing a locking bracket with the stand removed for clarity.
Figure 8:
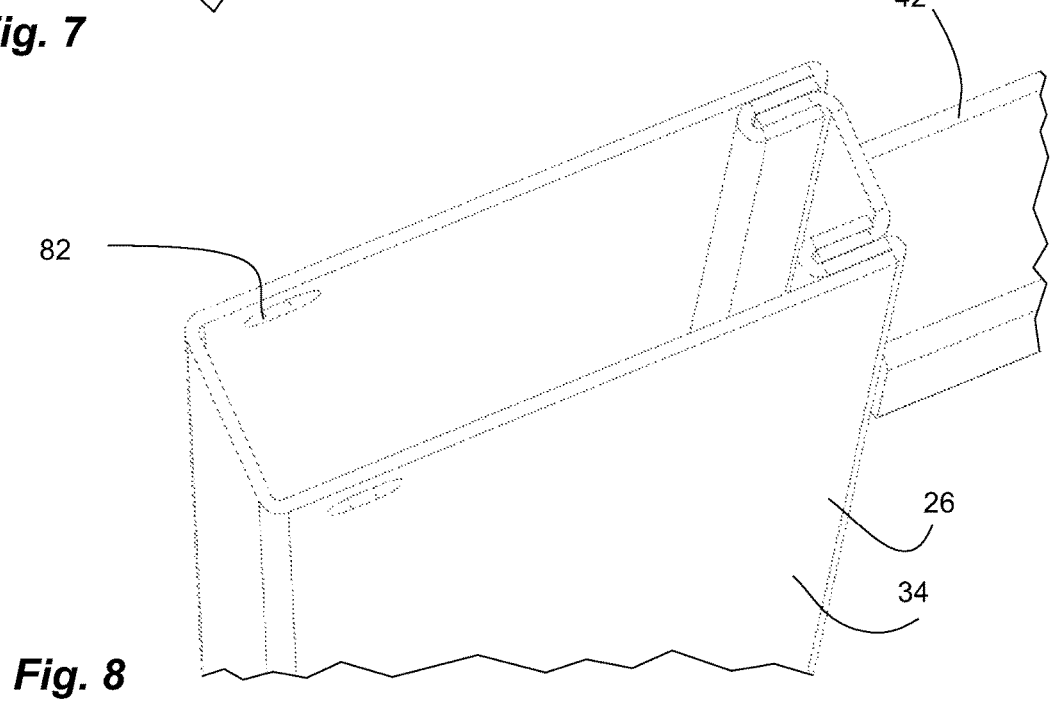
FIG. 8 is a partial top view of the stand of the table of FIG. 1a, shown with the tabletop removed for clarity.
Figure 9:
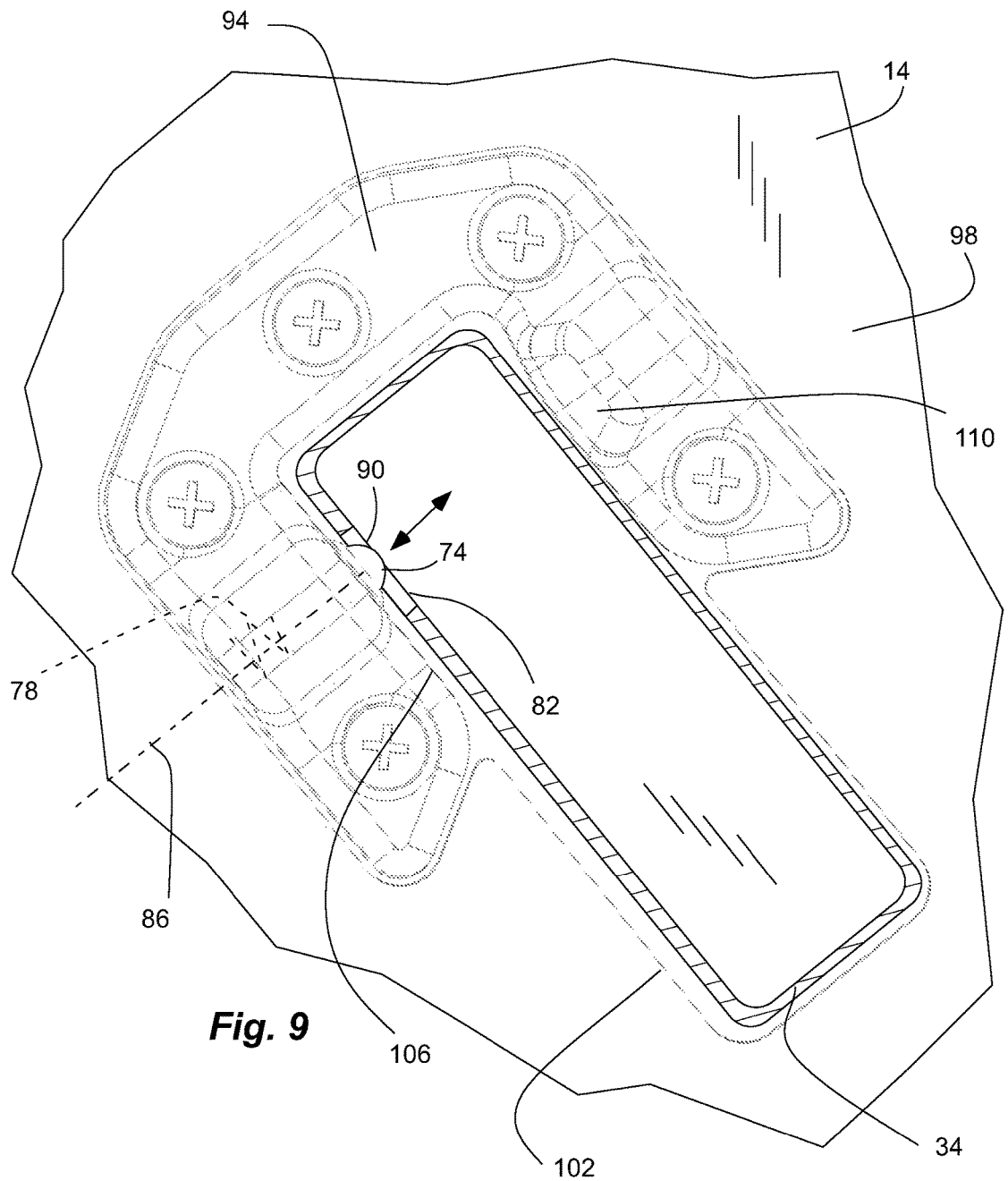
FIG. 9 is a partial top view of the tabletop of the table of FIG. 1a, showing the locking bracket with the stand removed for clarity.
Figure 10:
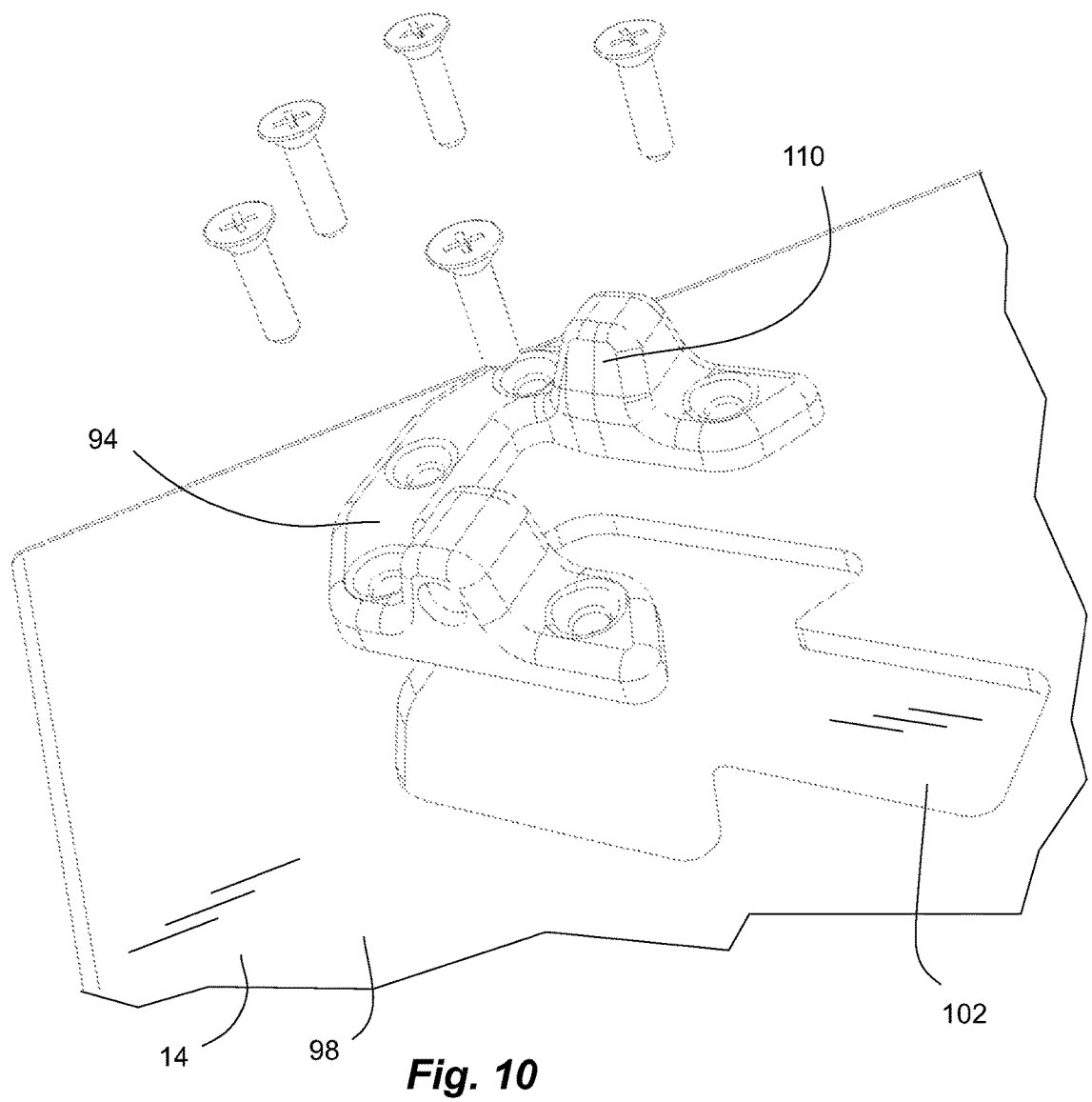
FIG. 10 is a partial exploded perspective view of the tabletop of the table of FIG. 1a, shown with the frame removed.
Figure 11:
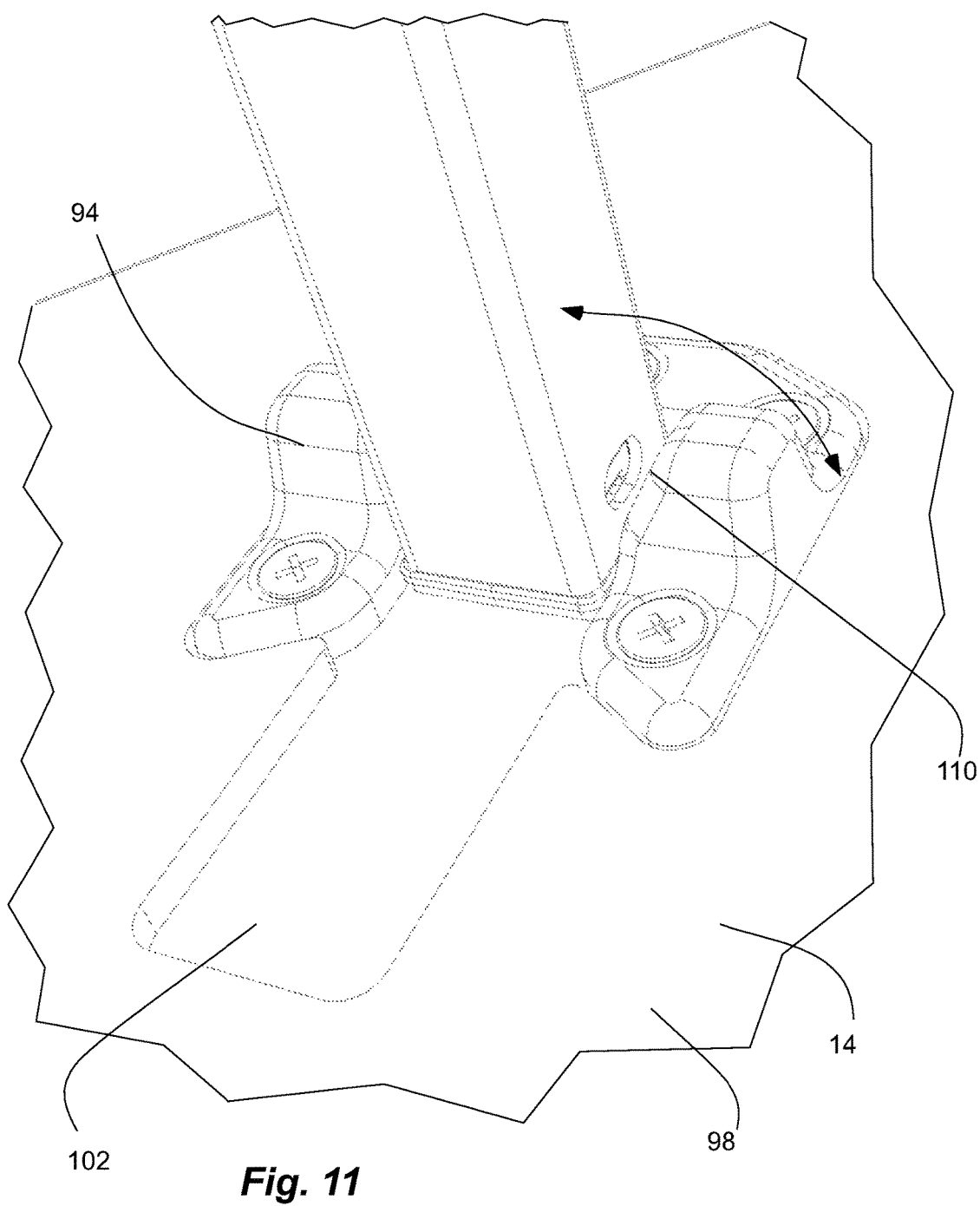
FIG. 11 is a partial perspective view of the tabletop of the table of FIG. 1a, shown with a leg in the locking bracket.

The brackets 94 can be formed of plastic, and can be formed by injection molding. In another aspect, each bracket 94 can have a thickness or height to extend out of the pocket 102 and beyond a bottom or underside 98 of the tabletop. Thus, the brackets 94 can also form or define bumpers to abut to a top of an adjacent stacked tabletop 114, as shown in FIG. 5.

Figure 12:
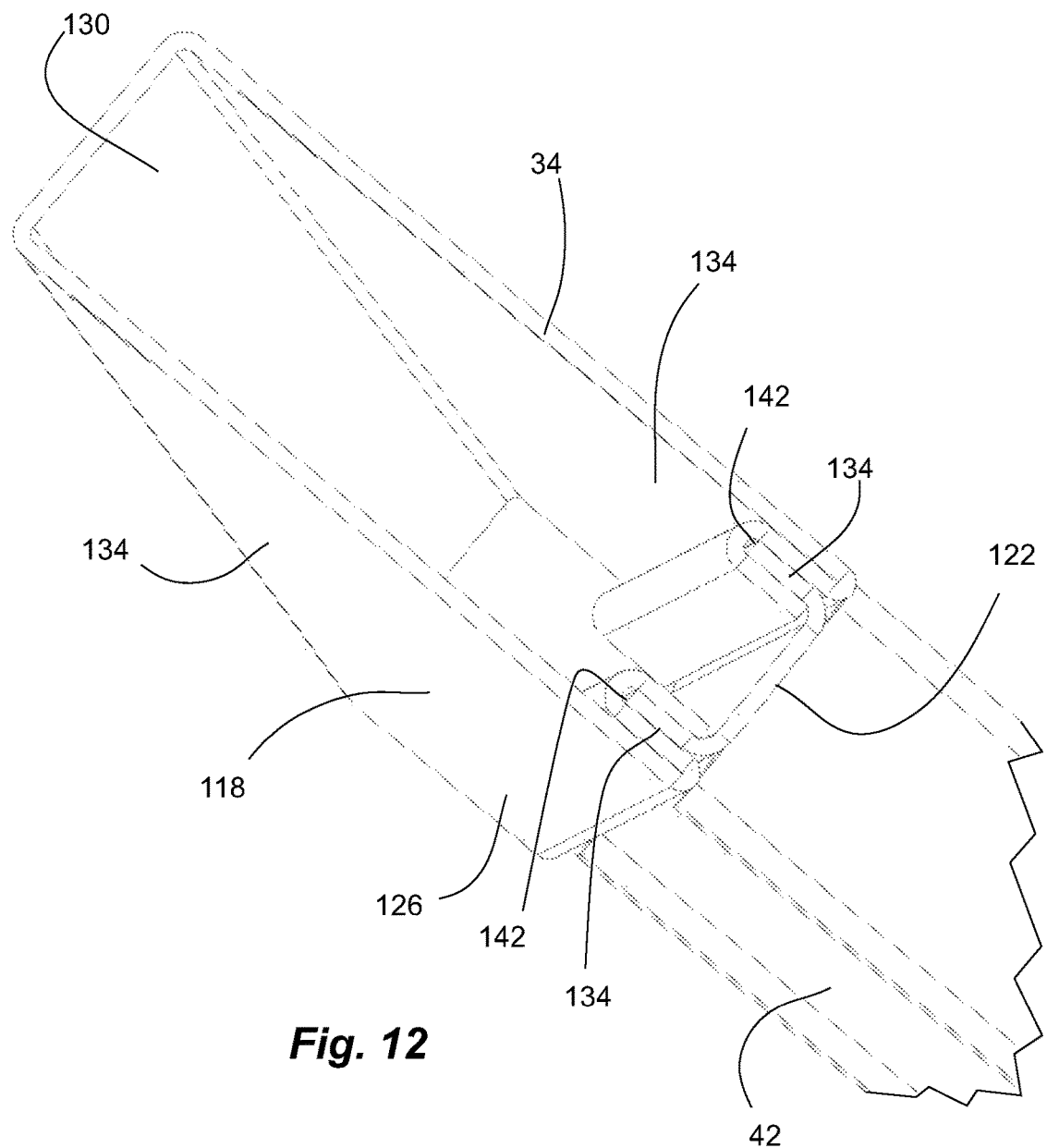
Figure 13:
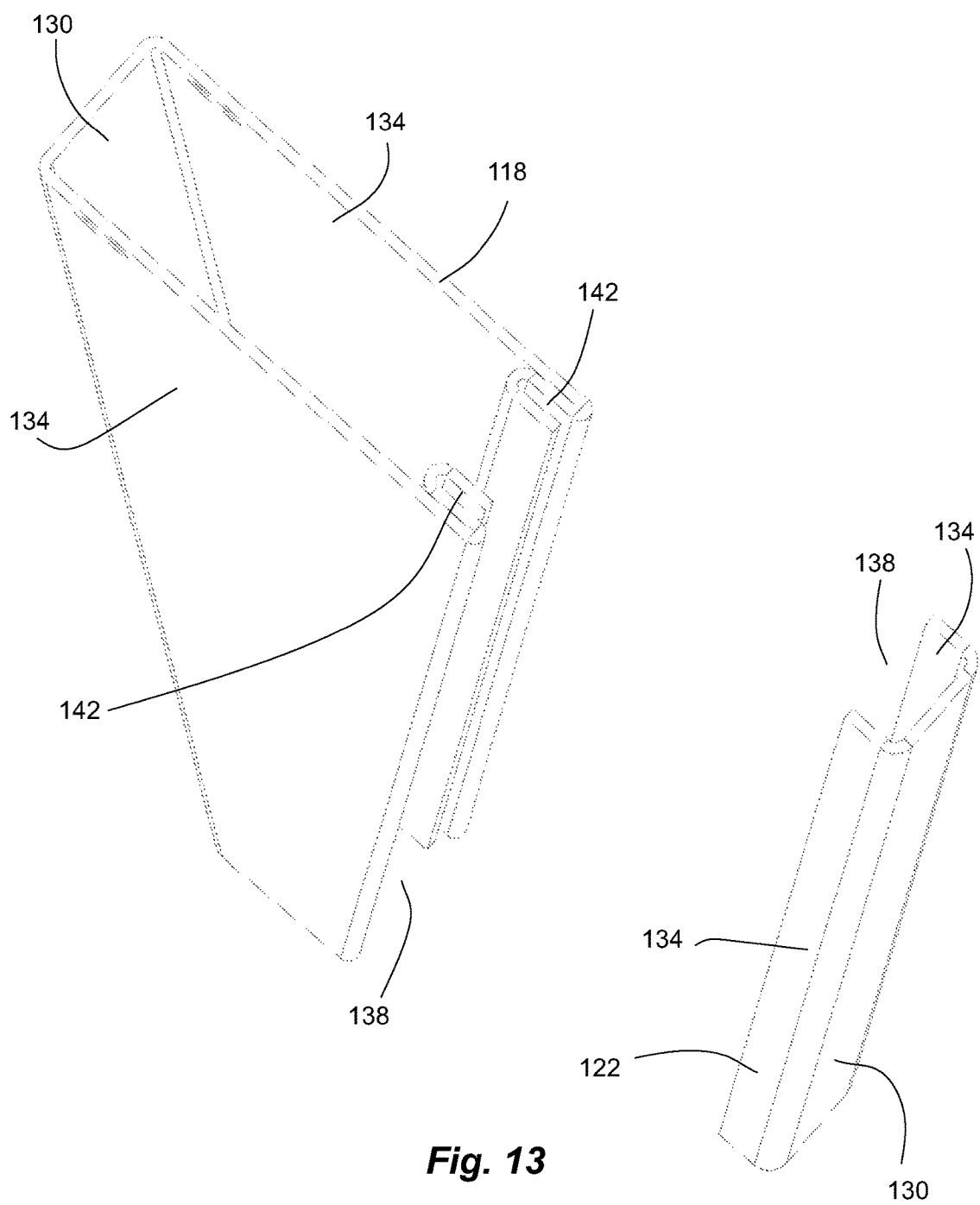

The legs 34 can be formed of metal, such as sheet metal, and can be formed by bending the sheet metal. Referring to FIGS. 12 and 13, each leg 34 can comprise a pair of facing, nested channels 118 and 122. The channels 118 and 122 can form a continuous perimeter wall 126. In addition, the channels 118 and 122 can have a primary channel 118 receiving a nested secondary channel 122 therein. Each of the channels 118 and 122 can have a bottom wall 130 and a pair of side walls 134 and an open top 138. The primary channel 118 has grooves 142 formed in the pair of side walls 134 to receive the side walls 134 of the secondary channel 122. The grooves 142 can be formed by the side walls 134 by being folded in and back. The secondary channel 122 or the side walls 134 thereof are sized so that the bottom wall 130 of the secondary channel 122 closes the open top 138 of the primary channel 118, and thus creating the continuous perimeter wall 126. The nesting channels allows for legs 34 to be formed in different shapes than standard tube stock. In addition, the nesting channels reduces pockets that can accumulate debris.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A table, comprising:
   a) a stand configured to be disposed on a support surface;
   b) a tabletop removably coupled to and disposable upon the stand;
   c) the stand comprising a pair of leg frames pivotally coupled together at an intersection between the pair of leg frames, the pair of leg frames comprising adjacent spars with each of the spars associated with a different one of the pair of leg frames, and with the adjacent spars pivotally coupled together at the intersection, the leg frames pivoting about a pivot axis perpendicular to the tabletop when disposed on the stand;
   d) the leg frames pivoting between an open use configuration in which the pair of leg frames traverse one another substantially perpendicularly, and a closed storage configuration in which the pair of leg frames are adjacent one another;
   e) a bushing carried by one of the adjacent spars;
   f) a fastener received through the bore of the bushing and coupling adjacent spars together, and the fastener defining an axle about which the adjacent spars pivot;
   g) the bushing being disposed between the adjacent spars of the pair of leg frames and separating the adjacent spars, and defining a safety spacer; and
   h) the safety spacer having a thickness so that the adjacent spars are spaced-apart by a gap greater than ¾" to resist pinching a user's fingers in a scissor effect between the adjacent spars as the leg frames pivot between the open use configuration and the closed storage configuration;
   i) locking brackets coupled to an underside of the tabletop and each receiving a different portion of the stand;
   j) each bracket having a slot to receive a respective portion of the stand therein;
   k) each bracket having a detent carried by the bracket on one side of the slot, and biased into the slot, and into a hole in a side of the respective portion of the stand; and
   l) each bracket having an angled side wall on one side of the bracket opposite the detent, the angled side wall forming an acute angle with respect to the tabletop to allow the tabletop to pivot with respect to the portion of the stand when being removed or installed on the stand.

2. The table in accordance with claim 1, further comprising:
   a) each of the pair of leg frames comprising upright legs coupled together by upper and lower spars, with the upper spars of the pair of leg frames being adjacent one another and pivotally coupled together, and the lower spars of the pair of leg frames being adjacent one another and pivotally coupled together;
   b) the pair of leg frames comprising inner and outer leg frames with the spars of the outer leg frame outside of the spars of the inner leg frame; and
   c) the safety spacer comprising a pair of safety spacers each disposed between a different one of the upper spars and the lower spars.

3. The table in accordance with claim 1, further comprising:

a) each detent being biased into a respective hole along an axis between the detent and the respective hole; and
b) each detent having a tapered head with a reduced diameter engageable with and bearable against a perimeter of the respective hole such that a lesser applied force applied transverse to the axis maintains the tapered head in the respective hole, while a greater applied force applied transverse to the axis displaces the tapered head along the axis out of the respective hole.

4. The table in accordance with claim 1, further comprising:
the leg frames comprising upright legs; and
each leg comprising a pair of facing, nested channels forming a continuous perimeter wall, including a primary channel receiving a nested secondary channel therein, each channel comprising a bottom wall and a pair of side walls and an open top, the primary channel having grooves formed in the pair of side walls to receive the side walls of the secondary channel, the bottom wall of the secondary channel closing the open top of the primary channel.

5. A table, comprising:
a) a stand configured to be disposed on a support surface;
b) a tabletop removably coupled to and disposable upon the stand;
c) the tabletop and the stand being coupled together with a snap-fit comprising detents between the tabletop and the stand;
d) locking brackets coupled to an underside of the tabletop and each receiving a different portion of the stand;
e) each bracket having a slot to receive a respective portion of the stand therein;
f) each bracket having a said detent carried by the bracket on one side of the slot, and biased into the slot, and into a hole in a side of the respective portion of the stand; and
g) each bracket having an angled side wall on one side of the bracket opposite the detent, the angled side wall forming an acute angle with respect to the tabletop to allow the tabletop to pivot with respect to the portion of the stand when being removed or installed on the stand.

6. The table in accordance with claim 5, further comprising:
each bracket being disposed in a respective pocket in the underside of the tabletop, and each bracket having a thickness extending out of the pocket and beyond a bottom of the tabletop to define a bumper configured to abut to a top of an adjacent stacked tabletop.

7. The table in accordance with claim 5, further comprising:
a) the stand comprising a pair of leg frames pivotally coupled together at an intersection between the pair of leg frames, the pair of leg frames comprising adjacent spars with each of the spars associated with a different one of the pair of leg frames, and with the adjacent spars pivotally coupled together at the intersection, the leg frames pivoting about a pivot axis perpendicular to the tabletop when disposed on the stand;
b) the leg frames pivoting between an open use configuration in which the pair of leg frames traverse one another substantially perpendicularly, and a closed storage configuration in which the pair of leg frames are adjacent one another;
c) a safety spacer disposed between the adjacent spars of the pair of leg frames and separating the adjacent spars; and d) the safety spacer having a thickness so that the adjacent spars are spaced-apart by a gap greater than ¾" to resist pinching a user's fingers in a scissor effect between the adjacent spars as the leg frames pivot between the open use configuration and the closed storage configuration.

8. The table in accordance with claim 7, further comprising:
the safety spacer being carried by one of the adjacent spars, and abutting to another of the adjacent spars.

9. The table in accordance with claim 7, further comprising:
adjacent spars being pivotally coupled together by a fastener defining an axle about which the adjacent spars pivot; and
the safety spacer having a bore therethrough receiving the fastener therethrough, and defining a bushing.

10. The table in accordance with claim 7, further comprising:
a) each of the pair of leg frames comprises upright legs coupled together by upper and lower spars, with the upper spars of the pair of leg frames being adjacent one another and pivotally coupled together, and the lower spars of the pair of leg frames being adjacent one another and pivotally coupled together;
b) the pair of leg frames comprising inner and outer leg frames with the spars of the outer leg frame outside of the spars of the inner leg frame; and
c) the safety spacer comprising a pair of safety spacers each disposed between a different one of the upper spars and the lower spars.

11. The table in accordance with claim 7, further comprising:
the leg frames comprising upright legs; and
each leg comprising a pair of facing, nested channels forming a continuous perimeter wall, including a primary channel receiving a nested secondary channel therein, each channel comprising a bottom wall and a pair of side walls and an open top, the primary channel having grooves formed in the pair of side walls to receive the side walls of the secondary channel, the bottom wall of the secondary channel closing the open top of the primary channel.

12. The table in accordance with claim 5, further comprising:
a) each detent being biased into a respective hole along an axis between the detent and the respective hole; and
b) each detent having a tapered head with a reduced diameter engageable with and bearable against a perimeter of the respective hole such that a lesser applied force applied transverse to the axis maintains the tapered head in the respective hole, while a greater applied force applied transverse to the axis displaces the tapered head along the axis out of the respective hole.

13. A table, comprising:
a) a stand configured to be disposed on a support surface;
b) a tabletop removably coupled to and disposable upon the stand;
c) the stand comprising a pair of leg frames pivotally coupled together at an intersection between the pair of leg frames, the pair of leg frames comprising adjacent spars with each of the spars associated with a different one of the pair of leg frames, and with the adjacent spars pivotally coupled together at the intersection, the leg frames pivoting about a pivot axis perpendicular to the tabletop when disposed on the stand;

d) the leg frames pivoting between an open use configuration in which the pair of leg frames traverse one another substantially perpendicularly, and a closed storage configuration in which the pair of leg frames are adjacent one another;

e) a safety spacer disposed between the adjacent spars of the pair of leg frames and separating the adjacent spars;

f) the safety spacer having a thickness so that the adjacent spars are spaced-apart by a gap greater than ¾" to resist pinching a user's fingers in a scissor effect between the adjacent spars as the leg frames pivot between the open use configuration and the closed storage configuration;

g) the tabletop and the stand being coupled together with a snap-fit comprising detents between the tabletop and the stand;

h) each detent being biased into a respective hole along an axis between the detent and the respective hole; and i) each detent having a tapered head with a reduced diameter engageable with and bearable against a perimeter of the respective hole such that a lesser applied force applied transverse to the axis maintains the tapered head in the respective hole, while a greater applied force applied transverse to the axis displaces the tapered head along the axis out of the respective hole;

j) locking brackets coupled to an underside of the tabletop and each receiving a different portion of the stand;

k each bracket having a slot to receive a respective portion of the stand therein;

l) each detent carried by a respective locking bracket on one side of the slot; and m) each bracket having an angled side wall on one side of the bracket opposite the detent, the angled side wall forming an acute angle with respect to the tabletop to allow the tabletop to pivot with respect to the portion of the stand when being removed and/or installed on the stand.

14. The table in accordance with claim 13, further comprising:

the leg frames comprising upright legs; and each leg comprising a pair of facing, nested channels forming a continuous perimeter wall, including a primary channel receiving a nested secondary channel therein, each channel comprising a bottom wall and a pair of side walls and an open top, the primary channel having grooves formed in the pair of side walls to receive the side walls of the secondary channel, the bottom wall of the secondary channel closing the open top of the primary channel.

* * * * *